(No Model.)
J. M. & N. H. LONG.
SAW HANDLE.
No. 461,502. Patented Oct. 20, 1891.
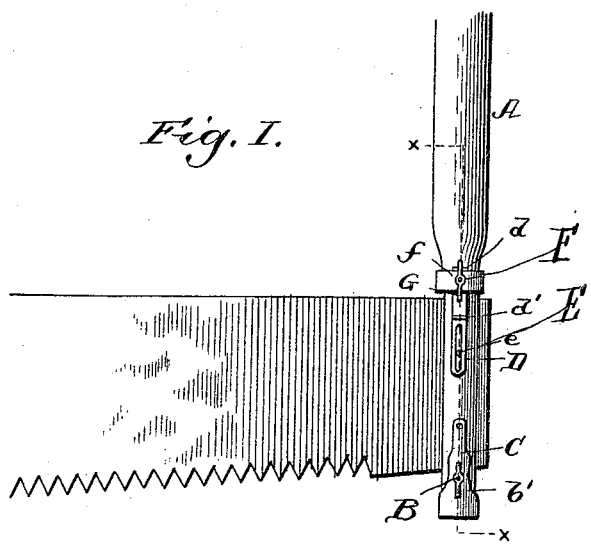
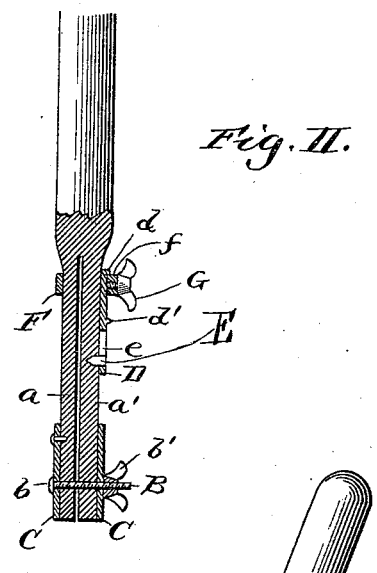
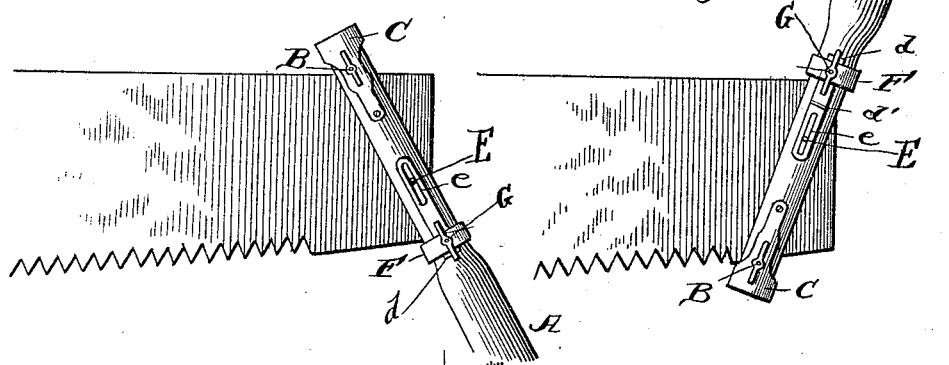
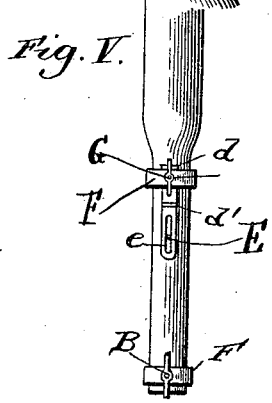
Witnesses:
Inventors.

United States Patent Office.

J. MILTON LONG AND NATHAN H. LONG, OF MUNCIE, INDIANA.

SAW-HANDLE.

SPECIFICATION forming part of Letters Patent No. 461,502, dated October 20, 1891.

Application filed April 7, 1891. Serial No. 387,987. (No model.)

*To all whom it may concern:*

Be it known that we, J. MILTON LONG and NATHAN H. LONG, citizens of the United States, residing at Muncie, in the county of Delaware and State of Indiana, have invented certain new and useful Improvements in Saw-Handles; and we do hereby declare the following to be a full, clear, and exact description of the invention, such as will enable others skilled in the art to which it appertains to make and use the same.

Our invention relates to improvements in handles for saws, and more particularly to that class which are used on crosscut and other large saws.

The object of our invention is to provide a handle which can be readily and firmly clamped to saw-blades of different sizes and arranged at any desired angle thereto, and which is secured in place in such a manner that an equal pressure is exerted on the saw-blade throughout the entire portion thereof clamped between the members of the handle; and a further object is to provide suitable means for adjusting and securing the handle firmly in position on the saw-blade.

With these ends in view our invention consists of a handle having its lower parts split or divided to receive a saw-blade, and the lower ends of this divided portion or the members formed thereby are joined together by a transverse bolt having a nut to tighten the ends of the members on the saw-blade, and thus clamp the blade tightly between the handle. Above this transverse bolt is a slotted bearing-plate, which extends longitudinally of the handle and is arranged to move on a headed screw projecting upwardly through the slot therein. The upper solid portion of this bearing-plate is provided with an upright lug on its end, and an adjustable ring is fitted on this flat solid portion of said plate, which ring passes around the members of the handle and is provided with a set-screw, by means of which it can be firmly clamped to the handle.

Our invention further consists of certain details of construction and arrangement of parts, as will be more fully described hereinafter.

To enable others to more readily understand our invention, we have illustrated the same in the accompanying drawings, in which—

Figure I is an elevation of our improved handle secured to a saw-blade at right angles thereto. Fig. II is a sectional view on the line $x\ x$ of Fig. I. Figs. III and IV show different ways of securing the handle on a saw-blade, and Fig. V is a side elevation of the handle provided with two adjustable binding-rings.

Referring to the drawings, in which like letters of reference denote corresponding parts in all of the figures, A designates a saw-handle, which has its lower portion reduced in diameter, so that it is smaller in cross-section than the handle proper as a rule, and this lower portion is split or divided longitudinally for a suitable distance, preferably for a sufficient distance to receive a saw-blade of the greatest width, the opening or slot between these two members $a\ a'$, formed by dividing the handle, being wide enough to receive an ordinary saw without unnecessary pinching.

The lower ends of the members are joined by a transverse bolt B, which passes through the ends and through plates C, secured on each member and conforming to the contour thereof, the rear plate C serving to protect the handle from mutilation and wear by the frequent adjustment of the bolt thereon. This screw-bolt B is provided with a head $b$ at one end and with a nut $b'$ at its other end, by means of which the bolt can be readily adjusted in place, and to provide for easy adjustment the nut is preferably provided with projections or lugs in order that it may be readily grasped and operated.

Above the transverse bolt B, and preferably arranged in the middle of one member, is a bearing-plate D, which is adapted to be adjusted longitudinally on the handle by means of a headed screw E, operating in a slot $e$ in one end of the plate. The upper portion of this plate is solid and has its end turned up to form a lug $d$ to prevent a collar or adjustable ring operating on the plate from sliding off, another lug $d'$ being provided above the slot $e$, which prevents the collar or ring from passing down over the slot. This bearing-plate is curved or has its under surface concaved to conform to the curved surface of the handle, and it is thus enabled to take a firmer hold or bearing on the handle when it is clamped by the collar or ring.

The collar or adjustable ring F is arranged to grasp the members of the handle firmly and clamp them tightly on the saw-blade, which is fitted between the members, and said collar has a large thickened portion $f$, which is cut away to fit over the bearing-plate. A set-screw G is arranged in this thickened portion and is adapted when tightened to clamp the collar firmly on the handle. This construction of the collar or ring enables the members to be securely clamped on saw-blades of different sizes, as the lower portion thereof fits snugly around one member of the handle, and the set-screw in the enlarged portion presses the bearing-plate firmly against the other member.

By this arrangement and construction of the handle and its attachments we are enabled to adjust it in saw-blades of any practical thickness or width, and also in the desired position or angle. This is especially important with relation to crosscut-saws, as it frequently happens that it must be used when the handles or one of them would be in the way if arranged in one position or not adjustable at any desired angle. In our device the handle can be placed on a blade and the collar or ring adjusted until the blade is securely fastened between the two bearings formed by said collar and the transverse bolt and then clamped in place by the set-screw therein. In this connection it may be desirable to form holes or notches in the saw-blade for the reception of the transverse bolt B; but with our arrangement this perforation of the blade is not necessary, as the bolt and the adjustable ring hold the blade firmly between themselves in addition to the friction-clutch formed by the two members of the handle.

In Fig. V we have shown the handle provided with an additional collar or ring in lieu of the transverse bolt B, which permits a better adjustment of the handle on the saw-blade.

We are aware that changes in the form and proportion of parts and details of construction can be made without departing from the spirit or sacrificing the advantages of our invention, and we therefore reserve the right to make such changes as fairly fall within the scope of our invention.

Having thus fully described our invention, what we claim as new, and desire to secure by Letters Patent, is—

1. A saw-handle divided longitudinally and secured together at its divided end by a transverse bolt, a bearing-plate arranged to slide longitudinally on one member of the handle, a collar or ring engaging the members of the handle and the bearing-plate, and the set-screw, substantially as described.

2. A saw-handle having its lower end divided longitudinally, a transverse bolt passing through the divided members, a slotted bearing-plate adapted to be adjusted longitudinally on one member of the handle, a collar or ring inclosing the members of the handle and the bearing-plate, and a set-screw operating in the collar and impinging against the bearing-plate to adjust the collar in position, substantially as described.

3. A saw-handle having its lower portion divided longitudinally and the ends of said divided portion provided with a transverse bolt, a bearing-plate having a slot to receive a screw in one member of the handle and provided with a solid portion above said slot and the upwardly-projecting lugs at either end thereof, and a collar or ring clamped to said solid portion of the plate by a set-screw, substantially as described.

4. The combination, with a divided saw-handle and the bolt, of an adjustable bearing-plate and a collar or ring fitted on the handle and said plate and provided with a binding-screw, substantially as and for the purpose described.

5. The combination, with a divided handle and a bolt, of the bearing-plate connected to one member of the handle, and a collar provided with a binding-screw and limited in its adjustment longitudinally on the handle by lugs on the bearing-plate, substantially as set forth.

In testimony whereof we affix our signatures in presence of two witnesses.

J. MILTON LONG.
NATHAN H. LONG.

Witnesses:
C. W. MOORE,
JOSEPH W. YOUNEL.